United States Patent
Camp et al.

(10) Patent No.: US 6,802,976 B2
(45) Date of Patent: Oct. 12, 2004

(54) ORGANIC SULFUR REDUCTION IN WASTEWATER

(75) Inventors: Carl Eugene Camp, Wilmington, DE (US); John George Hnat, Jr., Nottingham, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 208 days.

(21) Appl. No.: 10/145,340

(22) Filed: May 13, 2002

(65) Prior Publication Data

US 2003/0209490 A1 Nov. 13, 2003

(51) Int. Cl.$^7$ .................................................. C02F 9/14
(52) U.S. Cl. ........................ 210/620; 210/631; 210/758; 210/759
(58) Field of Search ................................ 210/620, 631, 210/626, 627, 725, 749, 753, 756, 758, 759

(56) References Cited

U.S. PATENT DOCUMENTS

| | | | |
|---|---|---|---|
| 3,904,518 A | | 9/1975 | Hutton et al. |
| 4,069,148 A | | 1/1978 | Hutton et al. |
| 4,321,143 A | * | 3/1982 | Wilms et al. ................ 210/631 |
| 4,623,464 A | * | 11/1986 | Ying et al. ................... 210/616 |
| 5,374,599 A | * | 12/1994 | Ishii et al. ................... 502/326 |

FOREIGN PATENT DOCUMENTS

| | | |
|---|---|---|
| JP | 53 094445 A | 8/1978 |

OTHER PUBLICATIONS

Edgewood Chemical Activity: "Neutralization/Blodegradation Process for Mustard Agent Disposal" Sbccom.Online, 'online1 Nov. 30, 2001; Retrieved from the internet.

Gilbert et al; "Ozonation of sulfur–containing aliphatic compounds in aqueous solution.1". Ozone Sci Eng; Ozone: Science and Engineering 1990 vol. 12: No. 3, pp 315–327.

Smet E et al: "Abatement of volatile organic sulfur compounds in odorous emissions from the bio–industry" Biodegradation 1998 Kluwer Academic Publ., Dordrecht, Netherlands, vol. 9, No. 3–4, 1998; pp 273–284.

Yeh, H. R. "Oxidation Destruction of Halogenated sulfides by hydrogen peroxide", FASEB (Federation of American Societies for Experimental Biology, vol. 2, No.,4 1988; pp ABSTRACT 477.

Smet G et al: Degradation of Sulfur Containing S–Trazinges During Water Chlorination:, Water Research, Elsevier Science vol. 28, No. 12, Dec. 1, 1994, pp 249902506.

Tsu–Shun Lee et al, Observations of Metabolite Formation and variable Yield in Thiodiglycol, Appl. Biochem, Biotechnol, 63–65: 743–757 (1997).

Steven P. Harvey et al, Kinetic and Toxicological Parameters of 'Mustard' (HD) Hydrolysis and Biodegradation, in J.F.Bennett and M, Mikolajczyk (eds.), Arsenic and Old Mustard: Chemical Problems in the Destruction of Old Arsenical and 'Mustard' Munitions, 115–122 (1998 Kluver Academic Publishers, Netherlands).

Tsu–Shun Lee et al., A Metabolic Model for Thiodiglycol Degradation: Capacity Constraint Leads to Byproduct Accumulation, Bioproc. Biosys. Enging. 24: 33–38 (2001).

Steven P. Harvey et al, Neutralization and Biodegradation of Sulfur Mustard, 615–636.

\* cited by examiner

*Primary Examiner*—Robert A. Hopkins

(57) ABSTRACT

A process for reducing organic sulfur in a fluid, which comprises an organic sulfur compound, comprises contacting the fluid with an oxidizing agent to produce a pretreated fluid and contacting the pretreated fluid with an biologically active solid.

18 Claims, No Drawings

US 6,802,976 B2

ORGANIC SULFUR REDUCTION IN WASTEWATER

FIELD OF THE INVENTION

This invention relates to a process for treating a fluid comprising an organic sulfur compound.

BACKGROUND OF THE INVENTION

Wastewater or waste fluid or processing discharge is present in many industrial operations such as chemical, mining, and mineral processes as substantially aqueous streams containing various organic sulfur-containing chemicals. Examples of wastewater include, but are not limited to, wastewater generated from the hydrolysis of bis-(2-chloroethyl) sulfide (mustard agent) containing primarily 2,2'-thiodiethanol (thiodiglycol) and trace amounts of other organic sulfur compounds. Any such wastewater being discharged from an industrial operation to a public water system must meet local requirements.

Treatment of wastewater from industrial operations is required before the treated water is passed into a river, lake or ocean. Treatment is frequently carried out through the action of aerobic or anaerobic bacteria on the wastes. This treatment involves biological decomposition of chemicals by supplying oxygen to bacteria which feed on the combination of oxygen and nutriments in the wastewater, thereby breaking down much of the chemicals into removable solids and carbon dioxide. This biological treatment is commonly carried out by the means of the trickling filter process, oxidation ponds or the activated sludge process.

The quantity of organic chemicals and other pollutants in wastewater is commonly determined by measuring the amount of dissolved oxygen required to biologically decompose the waste organic matter in the polluted water. This measurement, BOD (biochemical oxygen demand), provides an index of the organic pollution of water.

Wastewater derived from industrial processing that contains an organic sulfur compound can be odorous thereby creating a nuisance condition to the communities nearby the industrial processing site.

While there has been much attention devoted to the general area of wastewater treatment and, more specifically treatment of municipal wastewater, such treatment methods may not be effective for industrial processing wastewater in terms of cost or providing acceptable water quality. Therefore, there is a need for an efficient, cost-effective system to clarify wastewater fluids present in industrial processing.

An advantage of the invention is that the invention process renders the wastewater more amenable to a biological oxidation treatment. Other advantages of the invention will become more apparent as the invention is more fully disclosed herein below.

SUMMARY OF THE INVENTION

The invention provides a process for treating a fluid comprising an organic sulfur compound wherein the process comprises contacting the fluid with an oxidizing agent to produce a pretreated fluid and contacting the pretreated fluid with a biologically active solid.

DETAILED DESCRIPTION OF THE INVENTION

The term "fluid" refers to, unless otherwise indicated, liquid, gas, or combinations thereof. Examples of fluids include wastewater that can be a solution, a suspension, or an emulsion. The term "substantially" refers to more than trivial and can be nearly entirely.

The term "organic sulfur compound" refers to, unless otherwise indicated, any organic compound or salt thereof containing at least one sulfur in the molecule where the sulfur can be, but not necessarily, bonded to carbon. Examples of suitable organic sulfur compounds include, but are not limited to, 2,2'-thiodiethanol, 1,4-dithiane, 1,4-thioxane, thiophenol, sodium thiophenolate, 4-chlorothiophenol, and combinations of two or more thereof. The invention process is useful for treating a fluid containing an organic sulfur compound that can be oxidized to a sulfoxide, a sulfone, or both. The invention is especially suitable for treating a fluid containing 2,2'-thiodiethanol, also known as thiodiglycol, which is a hydrolysis product of bis-(2-chloroethyl) sulfide, commonly known as mustard agent.

Any oxidizing agents can be used in the present invention so long the oxidizing agent can render an organic sulfur compound-containing fluid more amenable to a biological treatment. Examples of suitable oxidizing agents include, but are not limited to, hydrogen peroxide, a hydrogen peroxide-generating compound, peracetic acid, an oxide of nitrogen, sodium peroxide, an organic peroxide such as benzoyl peroxide, chlorine dioxide, a halobenzoic acid such as 4-chlorobenzoic acid, an alkali metal bromate or alkaline earth metal bromate such as sodium bromate, t-butyl peroxide, hypochlorous acid an alkali metal hypochlorite such as sodium hypochlorite, chlorine, peroxy carbonate, an alkali metal perborate such as sodium perborate, an alkali metal persulfate such as potassium persulfate, an alkali metal permanganate such as potassium permanganate, and combinations of two or more thereof.

The contacting of the fluid with an oxidizing agent can be carried out under any condition that results in a pretreated fluid that can be readily treated with a biologically active solid. The condition can include a temperature in the range of from about 0° C. to about 100° C., preferably about 20° C. to about 50° C. and a pressure that can accommodate the temperature for a period sufficient to effect the production of a desired pretreated fluid, generally about 1 minute to about 24 hours. Mixing such as mechanical stirring can also be applied. Optionally a catalyst can be used to promote the oxidation process. Examples of suitable catalyst include, but are not limited to, an alkali metal tungstate such as sodium tungstate, an alkali metal molybdate such as sodium molybdate, an iron compound such as ferric chloride The pH of the pretreated fluid can be optionally adjusted, if desired or necessary, to about 4 to about 11, preferably to about 6 to about 9, and most preferably to about 7 to about 8. The adjustment can be carried out using lime, limestone, sodium hydroxide or other base, or using an acid such as sulfuric acid, hydrochloric acid, nitric acid, phosphoric acid, sodium bicarbonate, or combinations of two or more thereof. Such pH adjustment can produce excessive precipitation, or the fluid otherwise contains excessive solids. The solids can be removed or clarified by settling, decanting, or filtration to provide a fluid substantially free of solid products.

Thereafter, the fluid can be contacted with a biologically active solid such as, for example, an active sludge, fixed film having biologically active bacteria immobilized on the film, sands or other substances having immobilized thereon biologically active organisms, and combinations of two or more thereof such as a hybrid of activated sludge and fixed film. The contacting can optionally be carried out in the presence of an adsorptive (activated) carbon or fuller's earth. The adsorptive carbon or fuller's earth can be added to the fluid just prior to, during, or after the contacting of the fluid with the biologically active solid.

The contacting can be carried out batch wise, semi-batch, or continuously in any suitable vessel as well known to one skilled in the art such as, for example, a stirred tank and a fluidized bed reactor.

The amount of carbon employed can be in the range that provides between about 1 and about 1000 $m^2$ of surface per liter of fluid. It is preferred that the carbon or fuller's earth must be finely divided, i.e., the carbon or fuller's earth is of such particle size that passes through a 200 mesh per inch sieve. The carbon or fuller's earth can have a surface area of 100 $m^2/g$ or more. Such activated material can be obtained commercially.

Examples of activated carbon or fuller's earth include carbon produced from the destructive distillation of vegetable matter such as lignite, coal, pulp mill residues, nut shells and petroleum residues. Examples of fuller's earth include attapulgus clay.

The term "biologically active solid" as used herein refers to its normal meaning in biological treatment processes for wastewater and is well known to one skilled in the art. For example, those suspended solids which contain different types of bacteria formed by contacting wastewater can be used. A biologically active solid suitable for use in the invention can be the same type solid that is commonly referred to as "activated sludge", employed in water purification or those active solids found in oxidation ponds and other biological water treatment processes.

Because activated sludge, such as domestic sewage sludge from a city sewage plant activated sludge aerator, is well known to one skilled in the art, the invention herein below illustrates the activated sludge process. However, other biologically treatment methods are within the scope of the invention.

According to the invention, the fluid to be treated can contain a concentration of total biologically active solids in the range from about 1 to about 60,000 parts per million by weight (ppmw). The oxidation pond process, once it has reached a suitable concentration of biologically active solids, tends to maintain that level without solids addition. The total suspended solids, including the activated carbon or fuller's earth and the biologically active solids, can be in the range of from about 20 to about 80,000 ppmw.

The contacting of the fluid with biologically active solids can be carried out by any means known to one skilled in the art using any suitable terminal electron acceptors such as, for example, nitrate, carbon dioxide, and oxygen. Oxygen is the most commonly used. For example, oxygen (by supplying air) can be supplied to the fluid containing the biologically active solids, preferably by means of spargers or similar distributors in a manner which causes dissolution of oxygen in, and provides agitation to mix, the fluid and the biologically active sludge. Additional agitation may also be provided by mechanical stirrers.

The contacting of the fluid with the biologically active solids can range from about 2 hours to about 30 days or more under any suitable condition known to one skilled in the art. For example, it can be conducted at temperatures between about 5° C. and about 60° C. under atmospheric pressure. Preferably the contacting is carried out continuously and the flow rates are adjusted to provide a reaction time of about 1 to about 30 hours for activated sludge processes and about 2 to about 15 days for oxidation ponds.

Mineral salts, nitrogen, and phosphorus that are nutrients for the metabolism of biological active solids, if not already present in the fluid, can be added, for example, in the form of ammonium phosphate salt. Because these are well known to one skilled in the art, the description of which is omitted herein for the interest of brevity.

After the contacting with biologically active solids, the biologically active solids and carbon or fuller's earth, if employed, can be separated and recovered from the resulting fluid and are suitable for reuse. In a continuous process, a portion of the biologically active solids can be continuously returned to the vessel in order to maintain proper concentration of solids in the process.

Optional operations such as, for example, aeration for removal of odoriferous gases, such as hydrogen sulfide or coagulation of solid contaminants with inorganic materials or organic polymers can be carried out before or after the biological process.

The following Examples are provided to further illustrate the present invention and are not to be construed as to unduly limit the scope of the invention.

The example was conducted using three continuously operated bench-scale activated sludge processes (bioreactors) operated in parallel over a period of several weeks. All three bioreactors were continuously fed a stream of industrial wastewater at average flow rate of 4.2 liters/day. The working volume of each bioreactor was maintained at approximately 5 liters. The average hydraulic retention time for each bioreactor was approximately 20 hours. All three bioreactors were started-up with the same sample of activated sludge from the secondary treatment system of an industrial wastewater treatment plant from Chambers Works, N.J.

The wastewater, which was continuously fed to each bioreactor, was obtained from a sample of the influent to the same industrial wastewater treatment plant where the activated sludge sample was obtained. Each reactor was seeded with an identical quantity of activated sludge and fed at the same flow rate so that the performance between each bioreactor could be directly compared. The total suspended solids contained in each reactor were maintained at approximately 10,000 mg/liter (about 30% of which was activated carbon). Aerobic dissolved oxygen levels were maintained by bubbling air at a flow rate of 1500 ml/min into each bioreactor. The temperature was maintained at 25 C., and the pH was controlled at 7.0.

In the first bioreactor, no changes were made to the influent industrial wastewater sample except for the addition on a small quantity of phosphoric acid. To the second bioreactor, a sample of wastewater containing thiodiglycol (Sample A) was added. To the third bioreactor, Sample A pretreated with hydrogen peroxide was added. The feed to each reactor was prepared on a daily basis. Table 1 shows the daily feed preparation recipe. Sample analysis of Sample A wastewater indicated it had pH of 11.5; alkalinity of 494 mg/l; strong odor; and no soluble sulfides and cyanides. It was water miscible. E-BOD test was slightly inhibitory at 1% concentration. DOC test showed 2.1%. Sample A contained 4.56 weight % thiodiglycol (TDG). Other compounds tested were copper (3 ppm), iron (420 ppm), manganese (3.5 ppm), zinc (1.7 ppm), 1,4,dithiane (747 ppm), 1,2 dichloroethane (294 ppm), and NaCl (5–10%).

TABLE 1

| Bioreactor | Volume of Industrial Wastewater | Volume of Sample A (ml) | Volume of pretreated Sample A (ml) | Volume of 85 weight % $H_3PO_4$ |
|---|---|---|---|---|
| 1 | 6000 ml | 0 | 0 | 1 drop |
| 2 | 6000 ml | 20 | 0 | 1 drop |
| 3 | 6000 ml | 0 | 26 | 1 drop |

To pretreat Sample A, 300 ml of 11 weight % hydrogen peroxide were added to 1 liter of Sample A, mixed thoroughly, and allowed to react east 24 hours before adding to the industrial wastewater sample. Over 99 weight % of the TDG was converted to oxidation by-products by this treatment method. Liquid chromatography analysis of the feed to each reactor showed that over 90% of the oxidation by-product were the sulfoxide form of TDG. In addition to measuring TDG and TDG-sulfoxide, the operating performance of the bioreactors was determined by measuring the concentration of the influent and effluent dissolved organic carbon (DOC), chemical oxygen demand (COD), and biological oxygen demand (BOD) as a function of time. DOC, COD, and BOD were measured by Standard Methods for the Examination of Water and Washwater, 20th ed., 1998, edited by L. S. Clesceri, A. E. Greenberg, and A. D. Eaton. Table 2 shows the percent dissolved organic carbon removal vs. time.

TABLE 2

| Time (day) | Bioreactor 1 Control | Bioreactor 2 non-Pretreated | Bioreactor 3 Pretreated |
|---|---|---|---|
| 1 | 79.5 | 76.5 | 77.6 |
| 2 | 87.8 | 78.4 | 78.3 |
| 3 | 83.4 | 72.7 | 70.8 |
| 4 | 77.1 | 64.6 | 55.4 |
| 5 | 85.3 | 64.8 | 70.3 |
| 6 | 83.6 | 64.1 | 70.2 |
| 7 | 86.2 | 71.2 | 83.1 |
| 8 | 85.8 | 59.9 | 85.7 |
| 9 | 86.2 | 56.8 | 84.1 |
| 10 | 86.7 | 63.2 | 84.8 |
| 11 | 85.5 | 63.4 | 85.5 |
| 12 | 85.3 | 67.3 | 86.0 |
| 12 | 78.0 | 64.8 | 82.3 |
| 14 | 82.9 | 68.7 | 83.6 |
| 15 | 82.5 | 67.9 | 79.1 |
| 16 | 84.2 | 68.3 | 79.9 |
| 17 | 85.3 | 69.0 | 84.7 |
| 18 | 84.6 | 65.0 | 81.5 |
| 19 | 85.1 | 65.5 | 82.4 |
| 20 | 84.6 | 67.8 | 82.8 |
| 21 | 86.2 | 70.0 | 83.8 |
| 22 | 87.2 | 72.3 | 84.5 |
| 24 | 86.0 | 84.1 | 82.7 |
| 25 | 85.7 | 83.8 | 81.9 |

The results in Table 2 is summarized in Table 3 influent feed characteristics to each bioreactor (n.d. denotes not detected).

TABLE 3

| Bioreactor | DOC [mg/l] | COD [mg/l] | BOD [mg/l] | TDG [mg/l] | TDG-sulfoxide [mg/l] |
|---|---|---|---|---|---|
| 1 | 274 | 884 | 634 | n.d. | n.d. |
| 2 | 368 | 1344 | 875 | 140 | n.d. |
| 3 | 354 | 1220 | 635 | n.d. | 140 |

The data shows the increase in DOC, COD, and BOD of the feed to reactor 2 due to the TDG contained in Sample A, and to bioreactor 3 due to the TDG-sulfoxide contained in hydrogen peroxide pretreated Sample A.

The percent DOC removal shows that bioreactor 3, which was fed hydrogen peroxide-pretreated Sample A, was able to more rapidly acclimate to the feed containing TDG-sulfoxide compared to bioreactor 2 It took approximately two weeks for the percent DOC removals for bioreactor 3 to approach the performance of bioreactor 1 (the control) compared to over four weeks for bioreactor 2 to approach the performance of the control. The hydrogen peroxide pretreatment process was able to reduce the acclimation time by over 50%. Also, as shown in the Table 2, there was a substantial reduction in BOD by using hydrogen peroxide to pretreat Sample A. Given that the throughput of any wastewater treatment plant can be limited by the capacity to remove BOD, the data shows that the hydrogen peroxide pretreatment process could enable a higher throughput of Sample A since it reduces the BOD loading to the plant.

The odor of the feed to the reactors was also determined. The samples were quantified in terms of dilution-to-threshold (D/T) ratio and odor intensity (volume of odorous air/volume of clean air where the odor is first detectable) in accordance with ASTM Methods E-679-91 and E-544-99, respectively. The results showed that Chambers Works normal wastewater (feed going to the first bioreactor) had a D/T of 1,575. The higher the number the more odorous the sample. The wastewater feed used for #2 bioreactor had a D/T of 34,387 while the feed going to #3 bioreactor that had been pretreated with hydrogen peroxide had a D/T of 2,860. These results indicated that the wastewater containing an organic sulfur compound was (#2) very odorous. After the wastewater was treated with hydorgen peroxide (#3), the odor was essentially reduced to the same magnitude as control (#1). This demonstrates that the invention process not only facilitated the biological treatment, but also reduced the odor of the wastewater.

What is claimed is:

1. A process comprising contacting a fluid, which comprises an organic sulfur compound, with an oxidizing agent to produce a pretreated fluid and contacting said pretreated fluid with a biologically active solid wherein said oxidizing agent is capable of converting said organic sulfur compound to a sulfoxide, a sulfone, or combinations thereof; and said oxidizing agent is selected from the group consisting of hydrogen peroxide, a hydrogen peroxide-generating compound, peracetic acid, an oxide of nitrogen, sodium peroxide, an organic peroxide, chlorine dioxide, a halobenzoic acid, an alkali metal bromate or alkaline earth metal bromate, t-butyl peroxide, hypochlorous acid, an alkali metal hypochlorite, chlorine, peroxy carbonate, an alkali metal perborate, an alkali metal persulfate, an alkali metal permanganate, and combinations of two or more thereof.

2. A process according to claim 1 wherein said biologically active solid is activated sludge.

3. A process according to claim 1 wherein said organic sulfur compound is selected from the group consisting of 2,2'-thiodiethanol, 1,4-dithiane, 1,4-thioxane, thiophenol, sodium thiophenolate, 4-chlorothiophenol, and combinations of two or more thereof.

4. A process according to claim 2 wherein said organic sulfur compound is selected from the group consisting of 2,2-thiodiethanol, 1,4-dithiane, 1,4-thioxane, thiophenol, sodium thiophenolate, 4-chlorothiophenol, and combinations of two or more thereof.

5. A process according to claim 1 wherein said organic sulfur compound is 2,2'-thiodiethanol.

6. A process according to claim 2 wherein said fluid is wastewater derived from the hydrolysis of bis-(2-chloroethyl) sulfide.

7. A process according to claim 3 wherein said oxidizing agents is hydrogen peroxide.

8. A process according to claim 4 wherein said oxidizing agent is hydrogen peroxide.

9. A process according to claim 1 wherein said oxidizing agent is hydrogen peroxide.

10. A process according to claim 2 wherein said oxidizing agent is hydrogen peroxide.

11. A process according to claim 5 wherein said oxidizing agent is hydrogen peroxide.

12. A process according to claim 6 wherein said oxidizing agent is hydrogen peroxide.

13. A process comprising contacting a fluid containing an organic sulfur compound with an oxidizing agent to produce a pretreated fluid and contacting the pretreated fluid with a biologically active solid wherein said oxidizing agent is capable of converting said organic sulfur compound to a sulfoxide, a sulfone, or combinations thereof;

said oxidizing agent is selected from the group consisting of hydrogen peroxide, a hydrogen peroxide-generating compound, peracetic acid, an oxide of nitrogen, sodium peroxide, an organic peroxide, chlorine dioxide, a halobenzoic acid, an alkali metal bromate or alkaline earth metal bromate, t-butyl peroxide, hypochlorous acid, an alkali metal hypochlorite, chlorine, peroxy carbonate, an alkali metal perborate, an alkali metal persulfate, an alkali metal permanganate, and combinations of two or more thereof;

said biologically active solid is activated sludge; and said organic sulfur compound is selected from the group consisting of 2,2'-thiodiethanol, 1,4-dithiane, 1,4-thioxane, thiophenol, sodium thiophenolate, 4-chlorothiophenol, and combinations of two or more thereof.

14. A process according to claim 13 wherein said organic sulfur compound is 2,2'-thiodiethanol.

15. A process according to claim 14 wherein said fluid is wastewater derived from the hydrolysis of bis-(2-chloroethyl) sulfide.

16. A process according to claim 13 wherein said oxidizing agent is hydrogen peroxide-generating compound; said biologically active solid is activated sludge; and said organic sulfur compound is 2,2'-thiodiethanol.

17. A process according to claim 16 wherein said fluid is wastewater derived from the hydrolysis of bis-(2-chloroethyl) sulfide.

18. A process for reducing the concentration of organic sulfur compound in wastewater derived from bis-(2-chloroethyl) sulfide comprising contacting said wastewater with hydrogen peroxide to produce a pretreated wastewater and, thereafter, contacting said pretreated wastewater with activated sludge.

* * * * *

UNITED STATES PATENT AND TRADEMARK OFFICE
CERTIFICATE OF CORRECTION

PATENT NO.   : 6,802,976 B2
DATED        : October 12, 2004
INVENTOR(S)  : Carl E. Camp and John George Hnat, Jr.

Page 1 of 1

It is certified that error appears in the above-identified patent and that said Letters Patent is hereby corrected as shown below:

Column 7,
Line 6, "2,2-thiodiethanol" should read -- 2,2'-thiodiethanol --.

Signed and Sealed this

Twenty-eighth Day of March, 2006

JON W. DUDAS
*Director of the United States Patent and Trademark Office*